United States Patent
Burcham

(10) Patent No.: US 12,449,826 B2
(45) Date of Patent: Oct. 21, 2025

(54) PRESSURE REGULATOR

(71) Applicant: Hunter Agriculture Incorporated, San Marcos, CA (US)

(72) Inventor: Gregory S. Burcham, Falkville, AL (US)

(73) Assignee: Hunter Agriculture Incorporated, San Marcos, CA (US)

( * ) Notice: Subject to any disclaimer, the term of this patent is extended or adjusted under 35 U.S.C. 154(b) by 59 days.

(21) Appl. No.: 18/457,189

(22) Filed: Aug. 28, 2023

(65) Prior Publication Data

US 2025/0076904 A1  Mar. 6, 2025

(51) Int. Cl.
*G05D 16/10* (2006.01)

(52) U.S. Cl.
CPC .................................. *G05D 16/103* (2013.01)

(58) Field of Classification Search
CPC .............................. G05D 16/103; F16K 17/04
See application file for complete search history.

(56) References Cited

U.S. PATENT DOCUMENTS

| 4,543,985 A | 10/1985 | Healy et al. |
| 5,881,757 A | 3/1999 | Kuster et al. |
| 7,188,688 B1 * | 3/2007 | LeJeune ................ E21B 21/002 |
| | | 175/312 |
| 9,459,631 B2 | 10/2016 | Lawyer et al. |
| 2018/0319385 A1 * | 11/2018 | Aydemir ................ B60T 15/36 |

* cited by examiner

*Primary Examiner* — P. Macade Nichols
(74) *Attorney, Agent, or Firm* — KNOBBE, MARTENS, OLSON & BEAR, LLP

(57) ABSTRACT

Disclosed is a pressure regulator seat that includes a seat body and a base. The seat body can include a flange that extends radially from an upstream edge of the seat body. In some configurations the pressure regulator includes a first projection disposed on an upstream surface of the flange and that extends in an upstream direction so as to separate a flow of fluid flowing in a downstream direction into at least two flow paths. In some configurations, a throttling seat is disposed on a downstream surface of the flange and has a second projection. The flange and the base can form a chamber therebetween. The at least two flow paths can enter the chamber. In some configurations, the second projection can extend in the downstream direction and into the chamber.

20 Claims, 4 Drawing Sheets

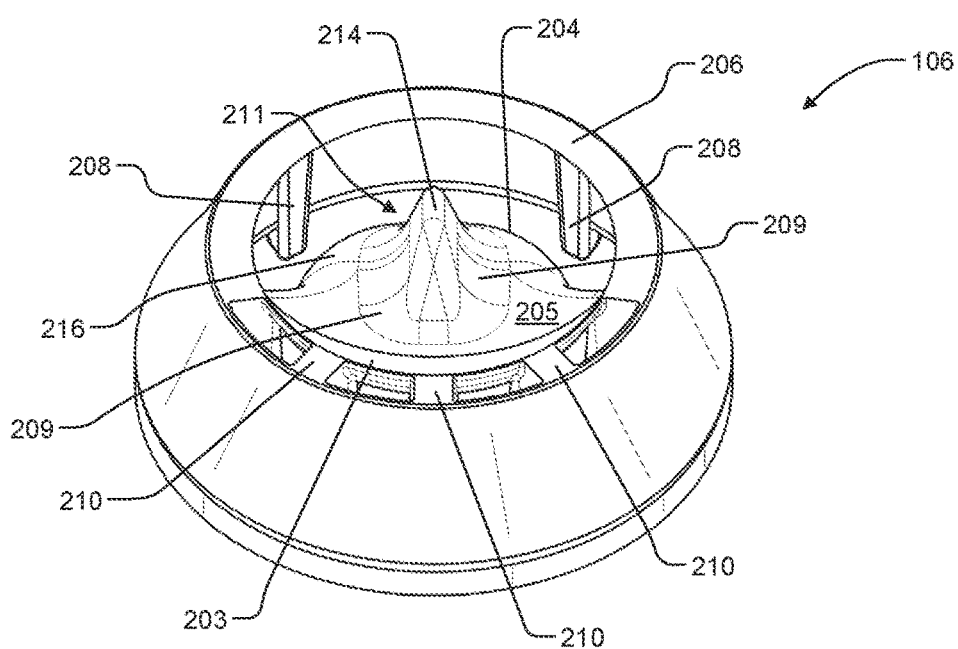
FIG. 6
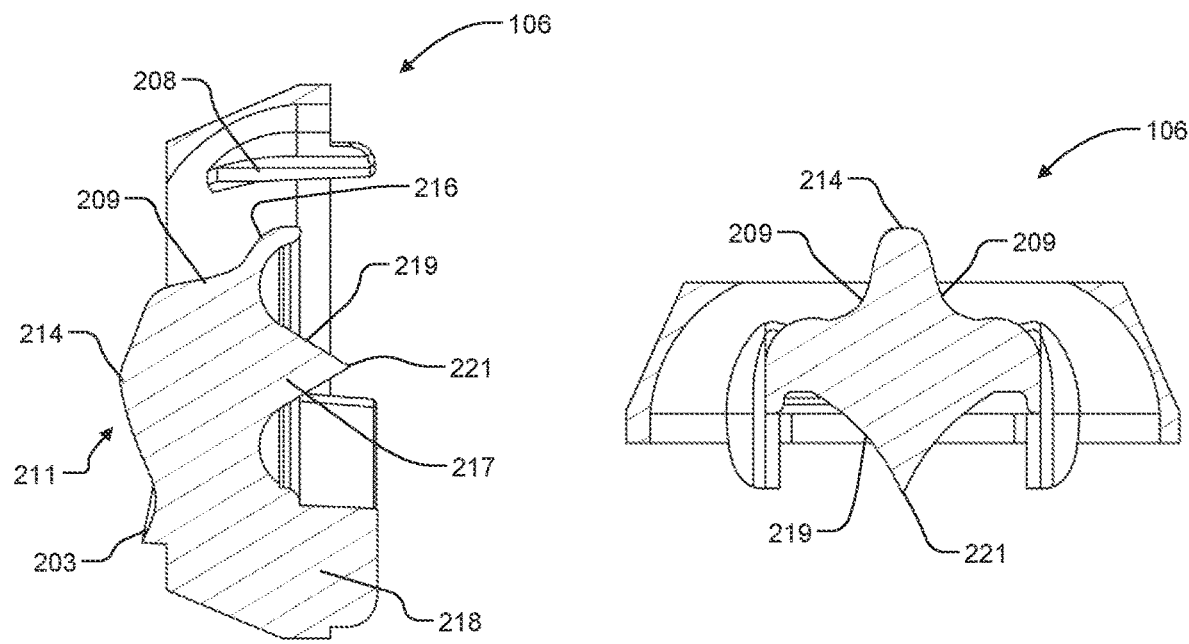
FIG. 7
FIG. 8

PRESSURE REGULATOR

FIELD

The present invention relates in general to pressure regulators and in particular to a pressure regulator seat assembly.

BACKGROUND

In sprinkler irrigation systems, water is received from a source of water under pressure and is introduced into a main water supply pipe which is connected with one or more distributing pipes forming a fluid conduit. The irrigation system includes a plurality of discharge irrigation sprinkler heads. Water pressure throughout the pipelines tends to vary for a variety of reasons and, as the pressure varies between two sprinklers having discharge orifices of exactly the same size, so does the output flow. The quantity of water discharged over any given period of time varies in relation to the variations in pressure, thus causing uneven distribution of water from a sprinkler system with a greater amount of water being discharged through sprinklers where the pressure is higher and a lesser amount through sprinklers where the pressure is lower. To counter this problem, pressure regulators have been developed which can be attached to the water line ahead of the sprinkler head to maintain constant pressure at the sprinkler head for all the sprinkler heads in the irrigation system.

There have been a great variety of fluid pressure regulators for regulating the flow of fluids through a pipe in irrigation systems. These pressure regulators typically rely on a spring biasing a piston or other member in a passageway for opening or closing a portion of the passageway. Passageways typically go around the seat and follow a circuitous passage. One prior art pressure regulator may be seen in Applicant's prior U.S. Pat. Nos. 4,543,985 and 5,881,757, which disclose a pressure regulator having a housing with a passageway therethrough and having a spring biased throttling stem. The throttling stem is mounted in the housing passageway for adjusting the opening through the pressure regulator seat assembly so that fluid pressure is adjusted between the input and output of the fluid pressure regulator. The throttling stem also has a dampening member or pressure controller to dampen oscillations in the throttling stem. A housing holds the pressure regulator's internal mechanism in place with or without the use of screws, other threaded fasteners or any other means of joining the housing for locking the components together.

U.S. Pat. No. 9,459,631 to Lawyer, et al., describes a pressure regulator seat assembly which includes a chamber, a tapered flange projecting from an upstream edge of the chamber into a flow path of the assembly, where a proximate end of the flange attached to the chamber is tapered continuously to its distal end into the flow path. The assembly includes a throttling stem seat disposed on a lower surface of the flange and a plurality of support ribs adapted to support the flange, where the plurality of ribs is spaced about one half side of the chamber. The assembly may also include a complementary base adapted to mount to the chamber about a downstream edge of the chamber to form the assembly.

The quality of water entering the pressure regulator may vary depending on the source. For example, the source of the water may be an open pond, underground well, irrigation canal, or city pipeline. The water may carry unwanted debris ranging from dispersed minerals to abrasive sand of varying grain size and even small rocks and pebbles. Over time, the debris may wear down portions of the seat causing it to leak or ultimately fail completely.

SUMMARY

An aspect is directed to a pressure regulator seat configured to separate a flow of fluid passing through a pressure regulator in a downstream direction into at least two flow paths. The pressure regulator seat comprises a seat body having a flange extending radially from an upstream edge of the seat body, a projection disposed on an upstream surface of the flange and extending in an upstream direction so as to separate the flow of fluid into the at least two flow paths, and a throttling seat disposed on a downstream surface of the flange. The pressure regulator seat further includes a base disposed downstream of the seat body. The flange and the base form a chamber therebetween. The at least two flow paths are configured to enter the chamber.

Additional aspects further comprise wherein the upstream surface of the flange is tapered in the downstream direction.

Additional aspects further comprise wherein an edge of the upstream surface of the flange is tapered.

Additional aspects further comprise wherein the projection on the upstream surface of the flange is sized and shaped so that the flow of fluid into the at least two flow paths is laminar.

Additional aspects further comprise wherein the downstream surface of the flange comprises a projection extending in the downstream direction into the chamber.

Additional aspects further comprise wherein the projection on the downstream surface of the flange is sized and shaped so that any turbulence about the throttling seat caused by the fluid entering the chamber along the at least two flow paths is reduced.

Additional aspects further comprise wherein the seat body and the base are manufactured as separate components.

Additional aspects further comprise wherein the seat body and the base are manufactured as a unitary structure.

Additional aspects further comprise wherein the upstream surface and the projection disposed on the upstream surface continuously slope in the downstream direction to an edge of the upstream surface of the flange.

Additional aspects further comprise wherein a proximate end of the flange attached to the upstream edge of the seat body tapers in the downstream direction to a distal end of the flange.

An aspect is directed to a pressure regulator seat configured to reduce turbulence in a flow of fluid passing in a downstream direction through a pressure regulator. The pressure regulator seat comprises a seat body having a flange extending radially from an upstream edge of the seat body, and a throttling seat disposed on a downstream surface of the flange and having a projection. The pressure regulator seat further includes a base disposed downstream of the seat body. The base and the flange form a chamber therebetween. The projection extends in the downstream direction and into the chamber.

Additional aspects further comprise wherein the projection on the downstream surface of the flange is sized and shaped so that the turbulence about the throttling seat caused by the flow of fluid entering the chamber is reduced.

Additional aspects further comprise wherein an upstream surface of the flange comprises a projection extending in an upstream direction so as to separate the flow of fluid into at least two flow paths into the chamber.

Additional aspects further comprise wherein the seat body and the base are manufactured as separate components.

An aspect is directed to a pressure regulator seat comprising a seat body having a flange extending radially from an upstream edge of the seat body, a first projection disposed on an upstream surface of the flange and extending in an upstream direction so as to separate a flow of fluid flowing in a downstream direction into at least two flow paths, a throttling seat disposed on a downstream surface of the flange and having a second projection, and a base disposed downstream of the seat body. The base and the flange form a chamber therebetween. The at least two flow paths are configured to enter the chamber. The second projection extends in the downstream direction and into the chamber.

Additional aspects further comprise wherein the first projection is sized and shaped so that the flow of fluid into the at least two flow paths is laminar.

Additional aspects further comprise wherein the second projection is sized and shaped so that any turbulence about the throttling seat caused by the fluid entering the chamber along the at least two flow paths is reduced.

Additional aspects further comprise wherein the upstream surface and the first projection continuously slope in the downstream direction to an edge of the upstream surface of the flange.

Additional aspects further comprise wherein a proximate end of the flange attached to the upstream edge of the seat body tapers in a downstream direction to a distal end of the flange.

Additional aspects further comprise wherein a peak of the first projection vertically aligns with a vertex of the second projection.

BRIEF DESCRIPTION OF THE DRAWINGS

FIG. 6 is a perspective top view of a particular embodiment of the pressure regulator seat assembly of FIGS. 4-5;

FIG. 7 is a cross section view taken along line VII shown in FIG. 4; and

FIG. 8 is a cross section view taken along line VIII shown in FIG. 4.

DETAILED DESCRIPTION

Figure 1:
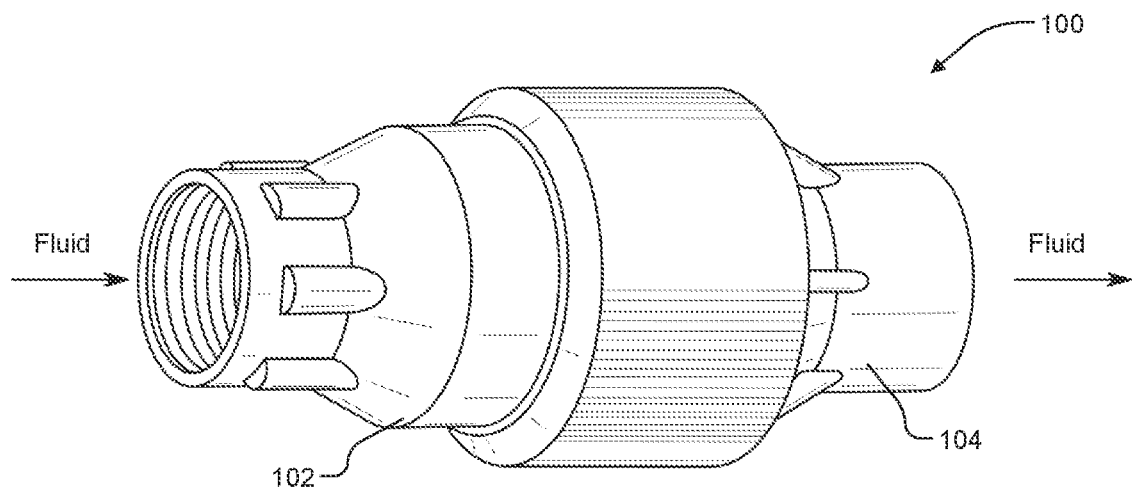
FIG. 1 is a perspective view of a particular embodiment of a pressure regulator.

Referring now to FIG. 1, a pressure regulator is illustrated and generally designated 100. The pressure regulator 100 includes an inlet housing 102 and an outlet housing 104. The pressure regulator 100 may be used for an irrigation sprinkler system such that the outlet housing 104 and inlet housing 102 have internal threads. The internal threading allows the pressure regulator 100 to be threadedly attached into the water line of the irrigation system to regulate the pressure of the water passing therethrough as indicated by the arrows.

Figure 2:
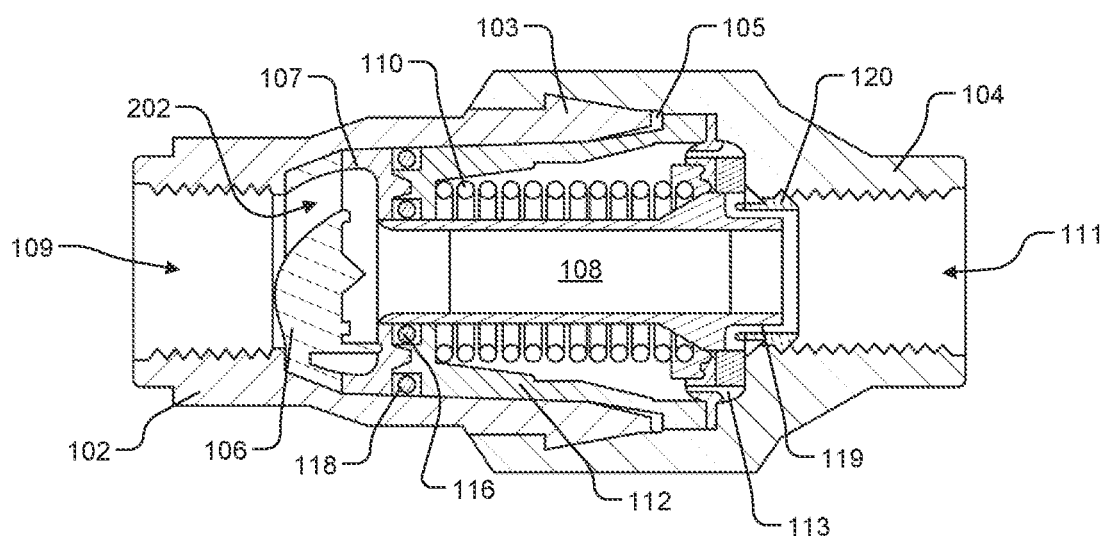
FIG. 2 is a sectional view of the pressure regulator of FIG. 1.
Figure 3:
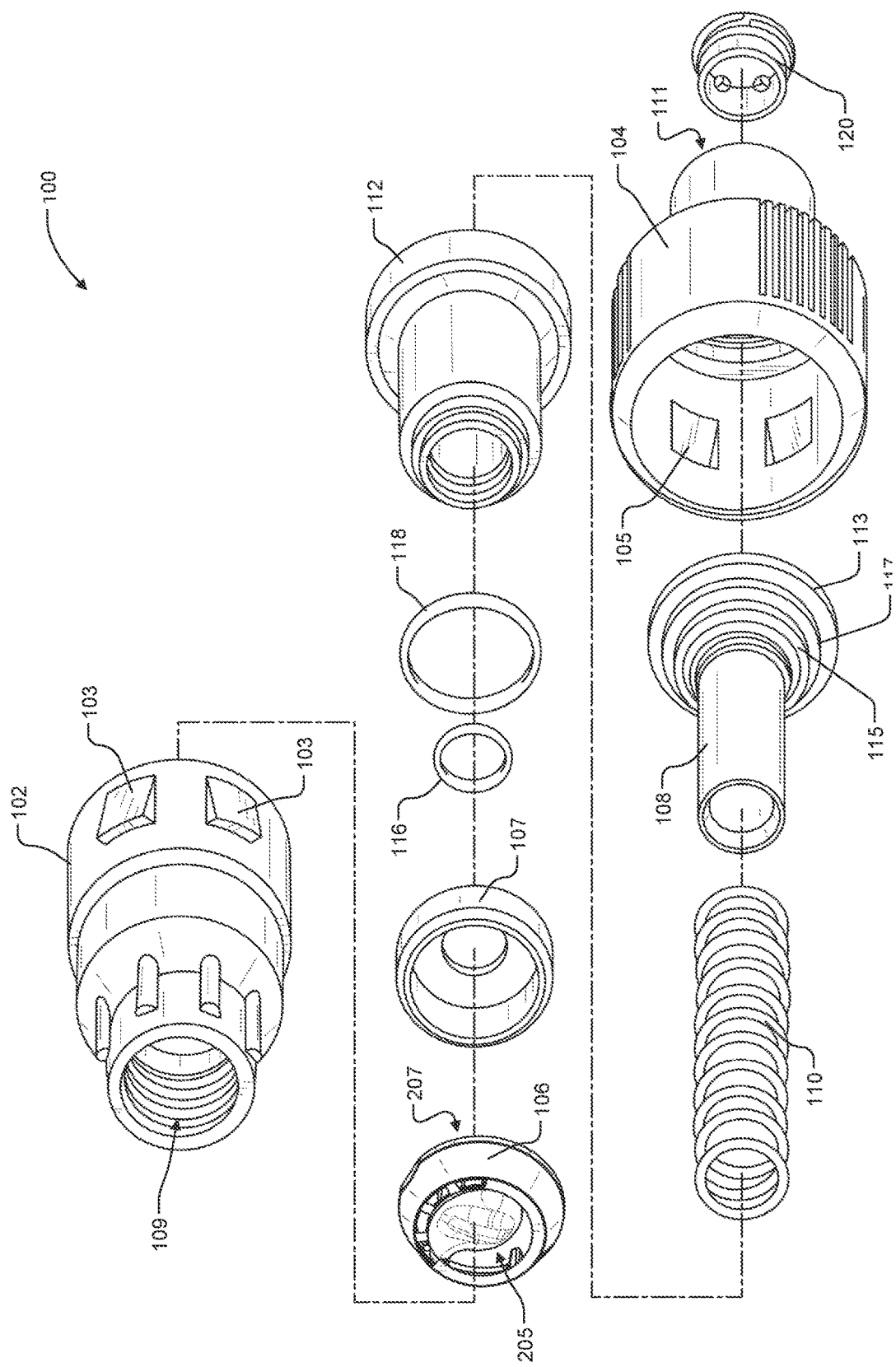
FIG. 3 is an exploded view of the perspective view of the pressure regulator of FIG. 1.

The pressure regulator 100 includes a pressure regulator mechanism, as seen in FIG. 2 and FIG. 3. The pressure regulator inlet housing 102 has a generally cylindrical connecting portion having a plurality of wedges 103 formed on its exterior. The pressure regulator outlet housing 104, as seen in FIG. 3, has a gripping surface formed on the exterior side thereof. The gripping surface is in the form of a plurality of ridges and grooves for gripping the outlet housing 104 for rotating or holding for threading a water connection line to the pressure regulator 100. The outlet housing 104 includes a plurality of internal niches 105 which are each formed having an internal wedge shape and each positioned to align with one of the wedges 103 on the inlet housing 102. The generally cylindrical surface of the inlet housing 102 is sized to fit into the interior cylindrical wall of the outlet housing 104 with a close tolerance which thereby leaves the wedge portions 103 protruding outside the interior wall of the outlet housing 104.

The housing portions 102 and 104 are made of a substantially rigid material, such as a thermoplastic polymer, so that to attach the inlet housing 102 to the outlet housing 104, requires that the inlet housing 102 be forced into the outlet housing 104 under sufficient force to expand the outlet housing 104 interior walls to drive the wedges 103 into the niches 105. Since the materials are substantially rigid materials, a larger amount of force is required to drive the housing portions 102 and 104 together to cause the expansion of the material but the housing portions 102 and 104 are locked together such that they will not later loosen. The housing portions 102 and 104 may be attached with the pressure regulator mechanism positioned thereinside so that the pressure regulator 100 is fully assembled when the housing portions 102 and 104 are driven together. The housing portions 102 and 104 cannot thereby be disassembled in the field and will not loosen with the loosening of screws or the softening of adhesives.

Turning to FIG. 3, the pressure regulator mechanism has a compression spring 110 riding on a throttling stem 108 having a flange portion 115 for holding one end of the spring 110 thereagainst. The flange portion 115 may also have an annular groove 117 formed therein which rides in an annular pressure dampener or diaphragm 113. An annular retainer 120 includes threads configured for engaging with the internal threads of the outlet housing 104. In certain embodiments, the annular retainer 120 is sized and shaped to encircle and provide at least lateral support to a downstream end 119 of the throttling stem 108 during axial movement of the throttling stem 108 within the pressure regulator 100.

In the illustrated embodiment, a pressure regulator seat includes a seat body 106 that is mounted inside the inlet housing 102 and rests in a complementary base 107. In certain embodiments, the seat body 106 and the base 107 are separately manufactured and subsequently assembled to form the pressure regulator seat. In certain other embodiments, the seat body 106 and the base 107 are manufactured as a unitary structure such as by, for example, machining, injection molding, multi-material injection molding or over molding, 3D printing or additive manufacturing, or other manufacturing techniques known to a person having ordinary skill in the art. Accordingly, the pressure regulator seat is not limited by the illustrated embodiment and can comprise one, two, three or more components and still fall within the scope of this disclosure.

The seat body 106 together with the base 107 form a chamber 202. In certain embodiments, the chamber 202 has curved interior surfaces that improve the hydraulic efficiency of fluid flow through the pressure regulator 100. O-ring 116 forms a watertight seal between the throttling stem 108 and a cup 112 while O-ring 118 is used to form a watertight seal between the cup 112 and the inlet housing 102. The exterior of the seat body 106 includes a first, upstream surface 205 facing an inlet opening 109 of the inlet housing 102 and a second, downstream surface 207 facing an outlet opening 111 of the outlet housing 104. The exterior of the seat body 106 may be formed with an upstream opening that is smaller in diameter than a downstream opening through the chamber 202 to increase hydraulic efficiency. Additional features of the first surface 205 and the second surface 207 are shown in greater detail with reference to FIGS. 4-8.

The outlet pressure of the water passing through the pressure regulator 100 is adjusted by the axial movement of the throttling stem 108 against which the diaphragm 113 is attached. The diaphragm 113 is also part of the area which has the outlet pressure applied thereagainst to compress the spring 110 and partially close the passage between the throttling stem 108 and the seat body 106 of the pressure regulator, until a balance is attained between the inlet water pressure and desired outlet water pressure, as determined by the compressive strength of the spring 110.

Figure 4:
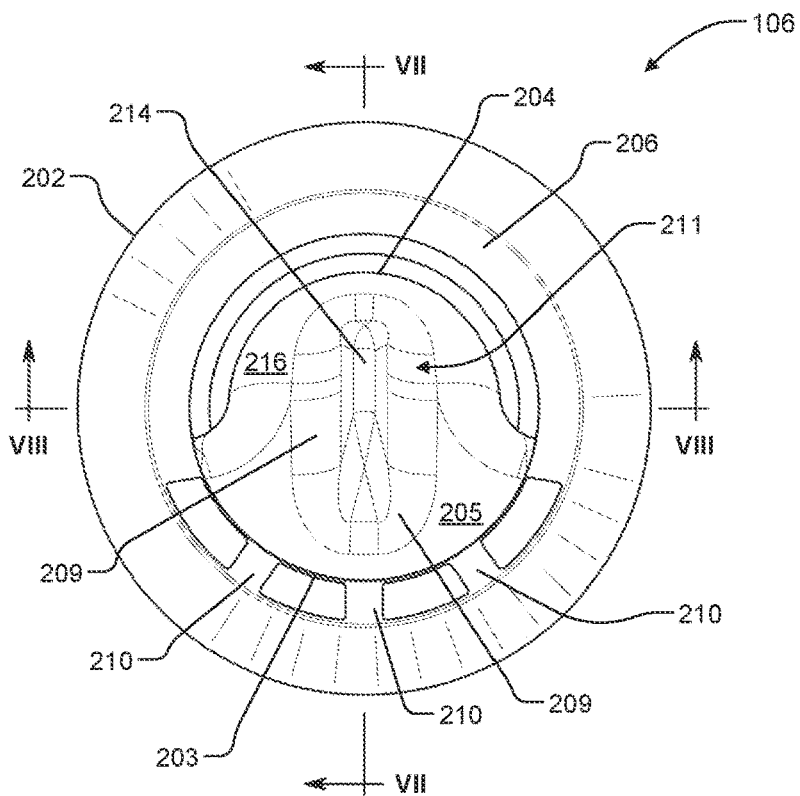
FIG. 4 is a top view of a particular embodiment of a pressure regulator seat assembly.
Figure 5:
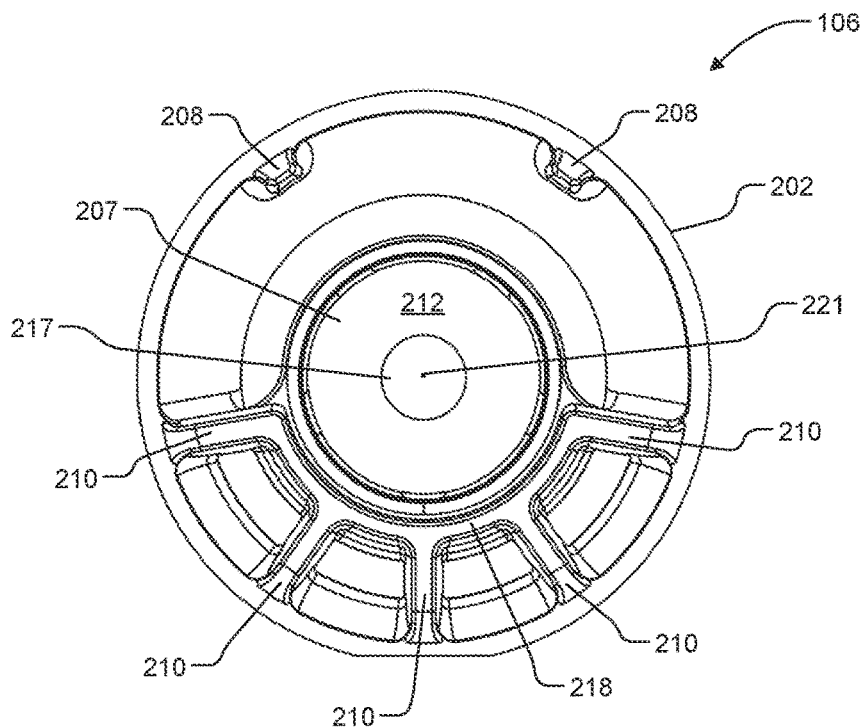
FIG. 5 is a bottom view of a particular embodiment of the pressure regulator seat assembly of FIG. 4.

Referring now to FIGS. 4-6, a particular embodiment of the seat body 106 is illustrated. A flange 204 projects radially from an upstream circumferential edge 203 of the seat body 106 into a flow path of the chamber 202. The flange 204 includes a first projection 211 extending from the first surface 205 towards the inlet opening 109. The first projection 211 may include first and second tapered surfaces 209 that continuously taper from a peak 214 of the first projection 211 to the first surface 205. A throttling stem seat 212 is disposed on the second surface 207 of the flange 204 and is adapted to receive the throttling stem 108. The flange 204 may include edges 216 that continuously taper from a base of the first projection 211 towards the throttling stem seat 212 or at least the flange 204 either tapers along its length or maintains its width with no necking or pinching to avoid hairpinning of fibrous material and trash.

A plurality of support ribs 210 are adapted to support the flange 204, where the ribs 210 are spaced about approximately one-half side of the seat body 106. The plurality of ribs 210 provide approximately 180 degrees of increased structural support around the throttling stem seat 212 to prevent breakage under high pressure or flows. The complementary base 107 is adapted to mount to the seat body 106 to form the chamber 202 about a downstream edge of the seat body 106. The complementary base 107 is adapted to secure and seal a downstream portion of the seat body 106 to the inlet housing 102 of the pressure regulator 100. The seat body 106 may also include a ledge 206 about a periphery of the upstream edge of the seat body 106 to provide an adjacent surface to seal an upstream portion of the seat body 106 to the pressure regulator inlet housing 102.

In a particular embodiment, the upstream surface 205 of the flange 204 may have a relatively flat surface that transitions to the edges 216. The first projection 211 extends along a centerline of the flange 204 following a radial path from the circumferential edge 203 to a point where the edges 216 meet and perpendicularly from the surface 205 towards the inlet opening 109, leaving an opening for fluid flow between the edges 216 and the remaining circumferential edge 203. Axial components of the chamber 202, such as the flange 204, are disposed in a same direction of the flow to assist in shedding any debris within a fluid flow through the pressure regulator 100.

For example, as best shown in FIG. 7, overall, the entire upstream surface 205 of the flange 204, including the first projection 211, slopes continuously downstream in the same direction as the flow to further assist in shedding any debris within the fluid flow. For example, the peak 214 of the first projection 211 also slopes downwardly from the outermost circumferential portion to the innermost portion nearest the opening. An annular wall 218 may be disposed about one half of the throttling stem seat 212 projecting downstream and supported by the plurality of ribs 210. At least one internal ridge 208 of the seat body 106 extends beyond the downstream edge of the seat body 106 to assist in positioning the seat body 106 over the base 107. On the second surface 207 of the flange 204, a second projection 217 projects towards the outlet opening 111. The second projection 217 may include a conical shape having a base attached to the second surface 207 and a face 219 extending to a vertex 221. The face 219 may include cone shape with a constant linear slope from the base to the vertex 221. The face 219 may include a parabolic shape with a varying slope from the base to the vertex 221. The base may have a radius that is less than a radius of an opening in the throttling stem 108 to prevent interference between the second projection 217 and the throttling stem 108.

As fluid flows into the upstream side of the seat body 106, the first projection 211 may direct the fluid flow substantially towards the edges 216 of the flange 204. In some examples, the first projection 211 may split the fluid into two or more flow paths around the flange 204 and through the chamber 202. Due to the tapered surfaces 209 and edges 216, the fluid travels in a laminar fashion along the upstream surface 205 and through the chamber 202 reducing wear effects caused by a more turbulent flow, especially when the fluid contains deposits, minerals, sand, and the like. The added thickness of material at the center of the flange 204 provides additional durability to further counter the wear effects as well. As the fluid flows into the downstream side of the seat body 106, the second projection 217 may continue to influence the fluid to travel in a laminar fashion about the second surface 207 and the throttling stem seat 212, eventually flowing out of the chamber 202 through the throttling stem 108.

Terminology

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

For expository purposes, the term "horizontal" as used herein is defined as a plane parallel to the plane or surface of the floor or ground of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the sprinkler has been disclosed in the context of certain embodiments and examples, it will be understood by those skilled in the art that the sprinkler and subassemblies extends beyond the specifically disclosed embodiments to other alternative embodiments and/or uses of the embodiments and certain modifications and equivalents thereof. For example, some embodiments are configured to operate oriented such that the distribution plate is positioned above the nozzle and the nozzle directs water upward. Accordingly, it is intended that the scope of the sprinkler herein-disclosed should not be limited by the particular disclosed embodiments described above, but should be determined only by a fair reading of the claims that follow.

What is claimed is:

1. A pressure regulator seat configured to separate a flow of fluid passing through a pressure regulator in a downstream direction into at least two flow paths, comprising:
   a seat body comprising:
      a flange extending radially from an upstream edge of the seat body;

a projection disposed on an upstream surface of the flange and tapering in an upstream direction so as to separate the flow of fluid into the at least two flow paths; and a throttling seat disposed on a downstream surface of the flange; and a base disposed downstream of the seat body, wherein the flange and the base form a chamber therebetween, and wherein the at least two flow paths are configured to enter the chamber.

2. The pressure regulator seat of claim 1, wherein the upstream surface of the flange is tapered in the downstream direction.

3. The pressure regulator seat of claim 1, wherein an edge of the upstream surface of the flange is tapered.

4. The pressure regulator seat of claim 1, wherein the projection on the upstream surface of the flange is sized and shaped so that the flow of fluid into the at least two flow paths is laminar.

5. The pressure regulator seat of claim 1, wherein the downstream surface of the flange comprises a projection extending in the downstream direction into the chamber.

6. The pressure regulator seat of claim 5, wherein the projection on the downstream surface of the flange is sized and shaped so that any turbulence about the throttling seat caused by the fluid entering the chamber along the at least two flow paths is reduced.

7. The pressure regulator seat of claim 1, wherein the seat body and the base are manufactured as separate components.

8. The pressure regulator seat of claim 1, wherein the seat body and the base are manufactured as a unitary structure.

9. The pressure regulator seat of claim 1, wherein the upstream surface and the projection disposed on the upstream surface continuously slope in the downstream direction to an edge of the upstream surface of the flange.

10. The pressure regulator seat of claim 1, wherein a proximate end of the flange attached to the upstream edge of the seat body tapers in the downstream direction to a distal end of the flange.

11. A pressure regulator seat configured to reduce turbulence in a flow of fluid passing in a downstream direction through a pressure regulator, comprising:
a seat body comprising:
a flange extending radially from an upstream edge of the seat body; and
a throttling seat disposed on a downstream surface of the flange and having a projection; and
a base disposed downstream of the seat body,
wherein the base and the flange form a chamber therebetween, and wherein the projection tapers in the downstream direction and into the chamber.

12. The pressure regulator seat of claim 11, wherein the projection on the downstream surface of the flange continuously slopes so that the turbulence about the throttling seat caused by the flow of fluid entering the chamber is reduced.

13. The pressure regulator seat of claim 11, wherein an upstream surface of the flange comprises a projection extending in an upstream direction so as to separate the flow of fluid into at least two flow paths into the chamber.

14. The pressure regulator seat of claim 11, wherein the seat body and the base are manufactured as separate components.

15. A pressure regulator seat comprising:
a seat body comprising:
a flange extending radially from an upstream edge of the seat body;
a first projection disposed on an upstream surface of the flange and tapering in an upstream direction so as to separate a flow of fluid flowing in a downstream direction into at least two flow paths;
a throttling seat disposed on a downstream surface of the flange and having a second projection; and
a base disposed downstream of the seat body,
wherein the flange and the base form a chamber therebetween, wherein the at least two flow paths are configured to enter the chamber, and wherein the second projection extends in the downstream direction and into the chamber.

16. The pressure regulator seat of claim 15, wherein the first projection is sized and shaped so that the flow of fluid into the at least two flow paths is laminar.

17. The pressure regulator seat of claim 15, wherein the second projection is sized and shaped so that any turbulence about the throttling seat caused by the fluid entering the chamber along the at least two flow paths is reduced.

18. The pressure regulator seat of claim 15, wherein the upstream surface and the first projection continuously slope in the downstream direction to an edge of the upstream surface of the flange.

19. The pressure regulator seat of claim 15, wherein a proximate end of the flange attached to the upstream edge of the seat body tapers in a downstream direction to a distal end of the flange.

20. The pressure regulator seat of claim 15, wherein a peak of the first projection vertically aligns with a vertex of the second projection.

* * * * *